Sept. 2, 1952   F. O. ROGERS   2,608,783
FISHING TIP-UP SIGNAL
Filed July 31, 1948
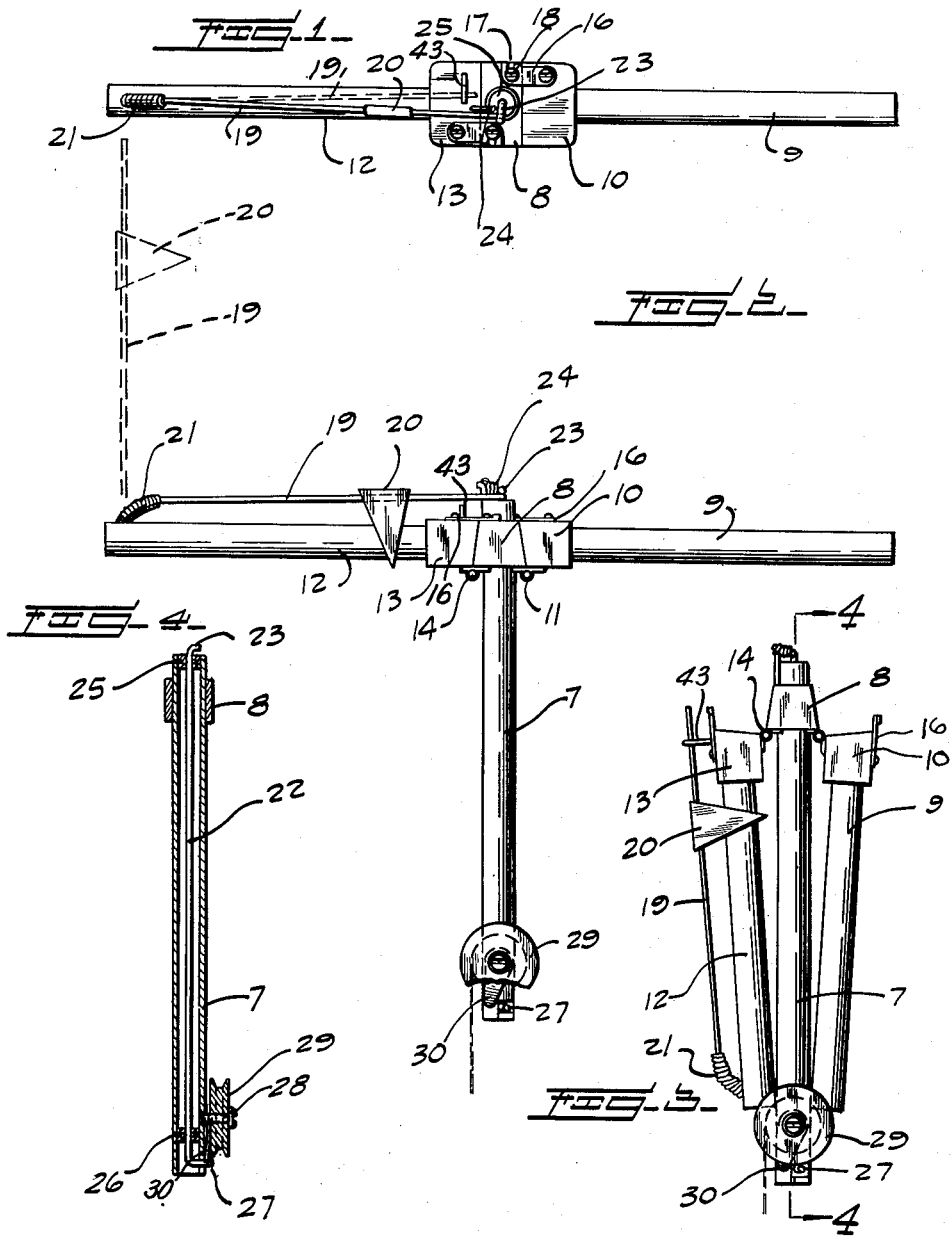
INVENTOR.
FRANK O. ROGERS.
BY
Thos. L. Donnelly
ATTORNEY.

Patented Sept. 2, 1952

2,608,783

UNITED STATES PATENT OFFICE 2,608,783

FISHING TIP-UP SIGNAL

Frank O. Rogers, Dearborn, Mich.

Application July 31, 1948, Serial No. 41,789

2 Claims. (Cl. 43—17)

My invention relates to a new and useful improvement in a fishing tip-up signal adapted for use in fishing and intended as a means to indicate when a strike has been made on the line. While the signal may be used for fishing in open water it is particularly adapted for fishing through the ice.

It is an object of the present invention to provide a fishing tip-up signal of this class whereby the operativeness of the structure will not be effected by a low temperature and the working parts will not become frozen or congealed at temperatures below freezing.

Another object of the invention is the provision in a device of this class of a signal member which may be released by means of a releasing member which is moved to releasing position when the line is unwound from a reel.

Another object of the invention which is the provision of the device of this class having parts easily connected together and foldable into compact relation while easily and quickly extended to operative form.

Another object of the invention is the provision of a device of this class that will be simple in structure, economical to manufacture, durable, light, and highly efficient in use.

Other objects will appear hereinafter.

It is recognized that various modifications and changes may be made in the detail of structure illustrated without departing from the invention and it is intended that such will be embraced within the scope of the claims which form a part of the present application.

Forming a part of this specification are drawings in which,

Fig. 1 is a top plan view of the invention,

Fig. 2 is a side elevational view of the invention,

Fig. 3 is a side elevational view of the invention in folded or compact form,

Fig. 4 is a sectional view taken on line 4—4 of Fig. 3.

As shown in the drawings the invention comprises a tubular standard 7 mounted on the upper end of which is a block 8. A laterally projecting arm 9 is provided with a block 10 which is swingably connected by the hinge 11 to the block 8. A laterally projecting arm 12 is provided at one end with a block 13 which is swingably connected to the block 8 by means of the hinge 14.

As shown in Fig. 3, the arms 9 and 12 may be folded to lie substantially parallel with the standard 7 so that a compact structure is thus provided which facilitates carrying the structure from place to place.

Mounted on each of the blocks 10 and 13 is a keeper or bar 16 and the keeper on each of the blocks is the same so the description of one will suffice for both. Swingably mounted at one end on the block 10 is a keeper or bar 16 having a slot 17 formed in its free end adapted to embrace the screw 18 which is mounted in the block 8. The structure is such that when the arm 9 is swung outwardly as shown in Fig. 1 and Fig. 2, the arm may be retained in position by means of this keeper.

A signal rod or arm 19 is provided with a suitable signal such as the flag 20. One end of this arm or rod 19 is connected to a spring 21 which is attached to the laterally extending arm 12, this spring normally tending to swing rod 19 into a vertical position as shown in the dotted line in Fig. 2.

Extended through the tubes 7 is a rod 22 which also extends through the sealing plugs or gaskets 25 and 26 mounted in said tube. The upper end of the rod 22 is angularly turned as at 23 and the lower end is angularly turned as at 27. The space in the tube 7 between the plugs 25 and 26 may be filled with a suitable non-freezing liquid or paste so that the rod 22 is always free for rotation regardless of the low temperature. The rod 22 with its angularly turned end 23 projects above the end of the tube 7 and above the plug 25 and is so positioned that when the rod 19 is folded downwardly to engage the end of the tube 7 as shown in Fig. 2, the rod 22 may be turned so that the angularly turned portion 23 will hook over the end of the rod 19 and hold it in the full line position as shown in Fig. 2. The spring 24 is connected at one end of the angularly turned portion 23 and at its opposite end to the tube 7 serving to normally rock the rod 22 into a position that the hook portion 23 will engage the rod 19 as shown in Fig. 2.

Rotatably mounted on the tube or standard 7 at the lower end is a reel 29 on which the fish line is adapted to be wound. Mounted on and rotatable in unison with this reel 29 and projecting outwardly from the periphery thereof is a tongue 30, which upon rotation of the reel 29 into a predetermined position, is adapted to engage the angularly turned end 27 so as to rotate the rod 22.

In use, when the structure is to be operated, the tubular standard 7 is projected downwardly into a hole in the ice so that the lower end thereof is submerged in water, with the arms 9 and 12 engaging the ice at opposite sides of the hole and thus serving to support the structure. The line which is wound upon the reel 29 is, of course, provided with a hook and necessary bait and the rod 22 and the rod 19 are moved into the full line position as shown in Fig. 2. The construction is such that when a strike is made and the line is pulled so as to rotate the reel 29 the tongue 20 will engage the angularly turned portion 27 and rock the rod 22 to release the rod 19, permitting the rod 19 to move to the dotted line position shown in Fig. 2. In this way the operator is apprised of the fact that a strike has been made at his line and thus warned of the necessity of giving the line attention. When the structure is folded into the position shown in Fig. 3 the end of the rod 19 is engaged beneath a hook 43 which is carried by the block 13.

Experience has shown that the structure is particularly useful when fishing through the ice as it prevents the freezing of the various operative parts and an operative structure is provided which will function at all low temperatures.

What I claim as new is:

1. A fishing tip-up signal of the class described comprising a tubular standard adapted for projecting through a hole in the ice and having its lower end submerged in the water and adapted for reception of non-freezing material; a closure for each end of said standard, a rod rotatably projected through said closures, said rod having an angularly outturned portion on the lower end thereof, a reel mounted on the lower end of said standard and adapted for rotation thereon and adapted for the reception of a fishing line, a tongue mounted on and projecting outwardly beyond the periphery of said reel at right angles to its axis of rotation and adapted for engaging the angularly outturned portion on said rod for rotating the same on its axis, a pair of laterally projected arms swingably mounted on the upper end of said standard and swingable in one direction to extend outwardly at right angles to said standard; and an abutment member on said standard for limiting swingable movement of said arms in said direction, a signal bearing rod swingably mounted on one of said arms, a spring member connecting one end of said rod to said arm and adapted for normally maintaining said rod in upwardly extended position, and an angularly outturned portion on the upper end of said first-named rod for engaging and bearing upon said signal bearing rod when the latter is folded downwardly into a parallel relation with respect to the arm on which it is attached, and moveable into non-engagement therewith upon rotation of said first-named rod by said tongue.

2. In a fishing tip-up signal of the class described, a tubular standard; a block mounted on said standard; a pair of arms; a block mounted on one end of each of said arms and swingably connected to the block on said standard, said arms being swingable in one direction to extend perpendicularly to said standard, said blocks being engageable with said first mentioned block for preventing further swinging movement of said arms in said one direction and an element on said first named block adapted to cooperate with keepers on said second named blocks for retaining said arms in a position perpendicular to said standard, said arms being swingable in the opposite direction to extend substantially parallel to said standard; a spring mounted on the outer end of one of said arms; and a signal bearing rod connected at one end to said spring and swingable to extend away from and upwardly of said arm, said rod being swingable downwardly to extend parallel to said arm, and upon the swinging of said arms into parallel relation with said standard for engaging a hook mounted on one of said blocks for retaining said rod in substantial parallel relation to the arm on which it is mounted.

FRANK O. ROGERS.

REFERENCES CITED

The following references are of record in the file of this patent:

UNITED STATES PATENTS

| Number | Name | Date |
|---|---|---|
| 518,013 | Thayer | Apr. 10, 1894 |
| 1,777,496 | Killory | Oct. 7, 1930 |
| 1,803,914 | Oberg | May 5, 1931 |
| 2,198,286 | Krivutza | Apr. 23, 1940 |
| 2,448,346 | Baugh et al. | Aug. 31, 1948 |
| 2,502,231 | Oberg | Mar. 28, 1950 |